April 11, 1944.   C. A. BREWER   2,346,354
CONTROL SYSTEM FOR MOTOR VEHICLES
Original Filed Oct. 2, 1929
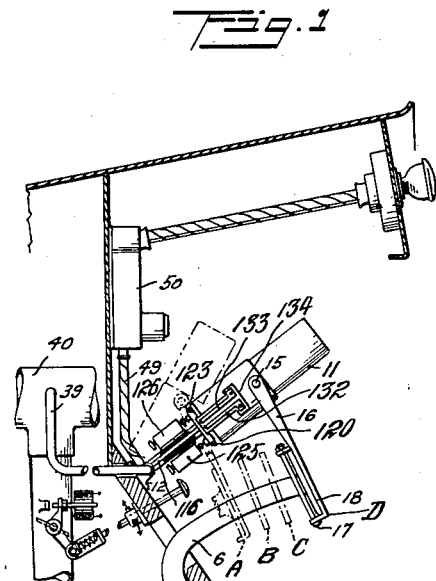
Fig. 1
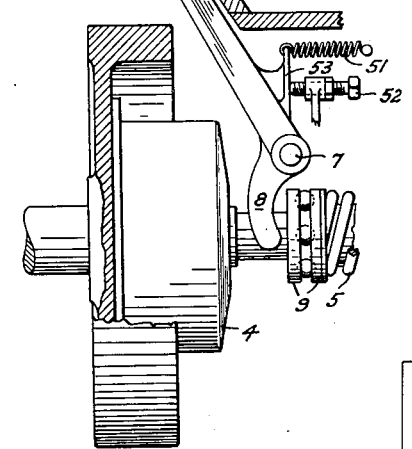
Fig. 3
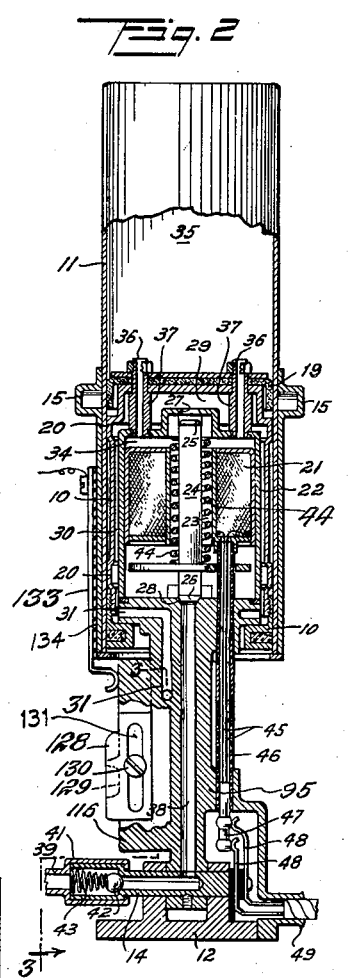
Fig. 2
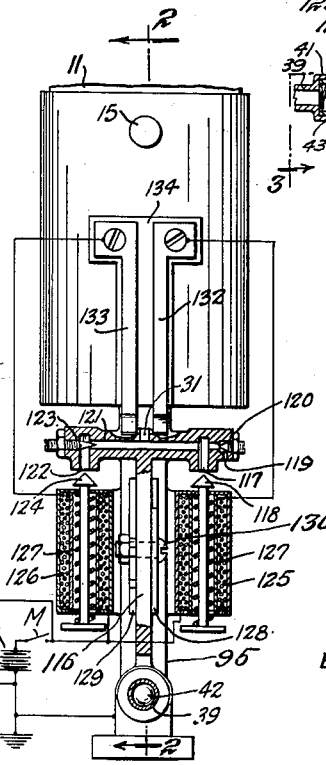
INVENTOR.
CHARLES A. BREWER
BY F. Bascom Smith
ATTORNEY Patented Apr. 11, 1944

2,346,354

UNITED STATES PATENT OFFICE 2,346,354

CONTROL SYSTEM FOR MOTOR VEHICLES

Charles A. Brewer, Noroton Heights, Conn., assignor of one-half to Philip J. Kury, Arverne, N. Y.

Original application October 2, 1929, Serial No. 396,691. Divided and this application January 17, 1944, Serial No. 518,651

6 Claims. (Cl. 192—.01)

This invention relates to motor vehicles or the like and more particularly to a safety control system for controlling the operation thereof whereby safety in operation and ease of control are materially enhanced.

This application is a division of my copending application Serial No. 396,691 for "Safety control system for motor vehicles," filed October 2, 1929, and all subject matter contained in said copending application which is applicable to the disclosure of the present application is made a part hereof by reference.

One of the objects of the present invention is to provide an improved operating and control means for the clutch of a motor vehicle or the like.

Another object of the invention is to provide novel means for controlling the power actuation of a clutch mechanism of a motor vehicle whereby safety is promoted, wear and tear on the vehicle and parts thereof are reduced, more uniform operation and control are attained, starting strains are reduced, and fatigue of the operator is materially lessened.

A further object is to provide an improved power control for a clutch whereby substantially no effort is required on the part of the driver in releasing the clutch and controlling the engagement thereof.

Still another object is to provide novel apparatus for actuating and controlling the engagement of a clutch of a motor vehicle or the like whereby a simulation of expert manual operation of the clutch is obtained.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this latter purpose to the appended claims.

In the drawing, wherein like reference characters refer to like parts throughout the several views, Fig. 1 is a diagrammatic side elevation of a portion of the vehicle, partly in section and with parts broken away, illustrating one form of apparatus embodying the present invention;

Fig. 2 is an enlarged scale sectional view, with parts broken away, of the clutch operating power device of Fig. 1, the section being taken substantially on line 2—2 of Fig. 3; and, Fig. 3 is a partial side elevation, partly in section, showing said power device and control means therefor, the section being taken substantially on line 3—3 of Fig. 2.

One form of clutch operating mechanism which may be employed in carrying out the present invention is illustrated, by way of example, in Figs. 1 to 3, inclusive, of the drawing wherein the clutch 4 of a motor vehicle, normally held in operative engaged position by a spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. A power device of the fluid pressure vacuum actuated type is provided for operating the clutch mechanism, said device being preferably attached directly to clutch pedal 6.

The power device comprises two relatively movable elements which, in the present case, are constituted by a piston element 10 and a cylinder 11 enclosing the piston, either of which may be movable. In the particular embodiment shown, the piston represents the stationary element and the cylinder is moved relative thereto in a manner and for a purpose to appear hereafter. A bracket 12 is mounted on the foot board of the vehicle adjacent pedal 6 for supporting the power device. Preferably a stem 95 is connected at its upper end to piston 10 and is pivotally connected at its lower end to bracket 12 by any suitable means such as a pivot pin 14. Cylinder 11 carries trunnions 15 adapted for pivotal connection with a bracket arm 16 which may be clamped by any suitable means, such as bolts 17, to the head or footrest 18 of clutch pedal 6. Therefore, as the cylinder moves, the clutch will be correspondingly shifted, the pivotal connections 14 and 16 permitting the power device to swing to compensate for the arcuate movement of head 18 about the pedal pivot 7.

The power device in the present instance is operated by suction from any suitable source such, for example, as the intake manifold of the vehicle motor and it is shown as being electrically controlled although it may be manually or mechanically controlled. Piston 10 may carry the usual cup leather 19 to prevent leakage past the piston and it is guided in the cylinder by the annular walls 20. This piston also carries control mechanism for the power device, said control mechanism comprising a solenoid coil 21 mounted in a casing 22 in the piston and having a central opening 23 through which extends an armature 24 having valves 25 and 26 at its opposite ends to control openings 27 and 28, respectively, in opposite ends of casing 22. Opening 27 is in the top wall of casing 22 and communicates with space 29 which in turn is normally in communication with the atmosphere through annular space 30 and passage 31 in piston 10. The space 34 within casing 22 communicates with the space 35 in cylinder 11 above piston 10 through a plurality of passages 36 in the connecting and spacing bolts 37.

The opening 28 and valve 26 control communication from space 34 and passage 23 to a passage 38 extending longitudinally in stem 95 of piston 10, the latter passage being in constant communication with the hollow center portion of pivot pin 14 which is in turn connected through a suitable tubular connection 39 with a source of suction such as the intake manifold 40 (Fig. 1) of the vehicle motor. A joint 41 permits relative turning movement between conduit 39 and pivot pin 14. This joint also serves as a means for carrying a check valve of any suitable type, such as ball 42, normally held against its seat by a spring 43. As shown in Fig. 2, check valve 42, 43 is so arranged as to permit air to flow from passage 38 to the intake manifold but to prevent flow of air in the opposite direction.

A spring 44 embraces the armature 24 and tends to shift the same downwardly to normally close valve 26, 28 and open valve 25, 27. Solenoid 21 is accordingly so constructed with relation to armature 24 that excitation thereof will raise the armature to close valve 25, 27 and open valve 26, 28. This will place passage 38 in communication with space 35 in cylinder 11 above piston 10, thus cutting said space off from communication with atmosphere and connecting the same with intake manifold 40, whereupon the air in space 35 is withdrawn through passage 36, spaces 23, 34, passage 38 and conduit 39. Cylinder 11 and bracket 16 are thus moved downwardly relative to piston 10 to actuate clutch pedal 6 and thereby disengage the driving surfaces of the clutch mechanism 4.

In order to energize solenoid 21 for the purpose above pointed out, lead wires 45 are led to the solenoid coil through a tube 46 attached to piston 10 and stem 95, said wires being connected at their other ends to a suitable jack 47. The lower end of the latter is contacted by a pair of spring contacts 48 which are in turn connected to a suitable source of electrical energy, such as a battery 62, through a flexible protective cable or conduit 49 and a connection box 50, said box being mounted in any suitable position where it is easily accessible and in which the desired electrical connections may be made to one or more suitable control switches, such as switches 54 and M.

It will of course be apparent that power device 10, 11 is normally in the full line position illustrated, i. e., with cylinder 11 in its upper position, valve 25 being open and space 35 being in communication with atmosphere through spaces 29, 30 and passage 31. Clutch pedal 6 is thus also normally in raised position and the clutch parts in driving engagement. Upon upward movement of the clutch pedal and hence that of cylinder 11 under action of a suitable spring 51, it is limited by an adjustable stop screw 52 carried by a stationary element of the vehicle frame and adapted to engage a lug 53 on pedal 6.

Novel means are provided in combination with the above described clutch operating power device for automatically controlling the engaging movement of the clutch. In the embodiment shown, conduit 31 has a branch 117 leading directly to the atmosphere, said branch being controlled by an electrically controlled valve 118. Passage 31 also communicates with the atmosphere through an opening 119 which is restricted by a needle valve 120. Another passage 121 which is in communication with passage 31 leads to the atmosphere at 122 through a restricting needle valve 123. The opening at 122 is controlled by an electrically controlled valve 124.

Valves 118 and 124 are controlled by solenoids 125 and 126, respectively, but are normally held in the open position by springs 127. Adjustably mounted on a rib 116 on the stem 95 are cam blocks 128 and 129, the adjustment being secured by clamping bolt 130 in slots 131 in the cams. These cams cooperate with spring contact fingers 132 and 133 mounted on insulating support 134 on the cylinder 11. Finger 132 co-acts with cam 128 while finger 133 co-acts with cam 129. The solenoids 125 and 126 will be grounded through the contact fingers 132 and 133 when the latter engage the surfaces of the cams 128 and 129 while the other terminals of the solenoids are connected to a suitable source of electrical energy, such as battery 62, one terminal of which is also grounded as indicated.

Accordingly, with the above described device the clutch is released or disengaged by connecting the solenoid 21 in circuit with a source of electrical energy by closing switches 54 and M. Energization of solenoid 21 effects movement of armature 24 to open valve 26 and close valve 25 to thereby connect chamber 35 with the intake manifold 40. When said chamber is evacuated, the external pressure is effective to move cylinder 11 and hence clutch pedal 6 downwardly to disengage the driving surfaces of clutch mechanism 4. While cylinder 11 is in its lowermost position with the clutch disengaged, spring fingers 132 and 133 will be below cams 128 and 129. When it is desired to effect engagement of the clutch, solenoid 21 is de-energized by opening switch 54 and armature 24 is moved to the illustrated position to thereby disconnect chamber 35 from the intake manifold and connect the same with atmosphere through passages 36, chambers 34 and 29, space 30 and passages 31, 117, 119 and 122. The entrance of air into chamber 35 tends to equalize the pressure inside and outside the power device and the clutch springs 5 and 51 start to engage the clutch and move cylinder 11 upwardly.

On the upward movement of cylinder 11 to permit clutch engagement, fingers 132 and 133 cooperate with the cams 128 and 129 to automatically control the clutch engaging movement. When the finger 132 engages the surface of cam 128 it will close the circuit through solenoid 125 so that the same will electro-magnetically lift valve 118 to closed position, thereby cutting off the flow of atmosphere into the power device through passage 117. When finger 133 engages the surface of cam 129, solenoid 126 will be energized and valve 124 will be moved thereby to close the port 122. The cams may therefore be so shaped as to control the upward movement of the clutch pedal or, that is, the engaging movement of the clutch to give ideal clutch operation in its engaging movement.

It will be seen that when valve 118 is open, it permits relatively free entrance of air into the cylinder of the power device. With valve 118 closed and valve 124 in open position the entrance of air to the cylinder is controlled by needle valves 120 and 123, which restrict the entrance of air and cause a partial vacuum in chamber 35 to retard upward movement of the pedal 6 and engagement of the clutch. With both valves 118 and 124 in closed position the entrance of air is controlled by needle valve 120 only and so may be highly restricted, thereby increasing the vacuum resistance in the cylinder and further checking clutch engaging movement. Thus, valves 118 and 124 may be operated alternately or in whatever relation is necessary to get easy starting effort on the clutch.

Cams 128 and 129 are preferably so designed that the initial upward movement of cylinder 11 and hence the initial engaging movement of the clutch will be relatively rapid. This movement may take place before the fingers 132 and 133 engage their respective cams. At any predetermined point during the engaging movement of the clutch, such as a point just prior to the actual enagement of the clutch driving surfaces, fingers 132 and 133 may engage the cams 128 and 129 to thereby close both valves 118 and 124. The only air which can now flow into the power device must flow through restricted opening 119. The movement of the cylinder and, hence, the engaging movement of the clutch is thus checked or retarded. While both valves are closed, the engaging movement of the clutch is very slow, which is at it should be, when the clutch surfaces first begin to take hold and the car begins to move. Valve 124 may then be permitted to open as the car picks up speed, but is preferably again momentarily closed to permit the car to gain momentum while the clutch is held nearly stationary. Thereafter, when finger 132 leaves cam 128, free entrance of air is again permitted so that the remaining movement of the clutch pedal after the clutch is fully engaged will be effected against small resistance by spring 51. This last mentioned movement is allowed to insure the full engagement of the clutch and to permit disengagement of the operating extension 8 from the clutch collar 9 to prevent undue wear.

Thus, in the engaging movement of the clutch, the initial movement is preferably very rapid to quickly take up the lost motion and not delay starting, especially in traffic. Then at the point the clutch first begins to engage, the movement of the pedal must be very slow to permit the clutch to take hold and start the car with an easy gradual movement without jumping or jerking. After the car starts to move, the clutch may be let in more rapidly for a short period to get a greater engagement and driving force and then the pedal movement should be held substantially stationary for a short time to permit the car to gather more speed. Thereafter, the clutch may be let into full engagement and the remainder of the lost motion quickly accomplished. It will thus be apparent that this device automatically controls the engaging movement of the clutch to provide clutch operation which is a duplicate of expert foot control so that no matter how experienced or inexpert the driver may be the clutch is always operated in the same ideal manner to start the car without jumping or jerking, thus eliminating excessive strains on the car and tires and discomfort to the occupants. It also prevents stalling of the motor as the clutch is let in at the proper speed and eliminates racing of the motor such as might occur if the clutch is not engaged soon enough in foot operation.

Referring to Fig. 1, some of the various positions of the clutch pedal are indicated in full and dotted lines. Thus, the dotted line position A indicates the completely depressed position with the clutch disengaged and the distance from position D to position A represents the travel to insure complete disengagement of the clutch for proper gear shifting. Travel from A to B shows the first part of the engaging movement which is very rapid, B being the position just before the clutch begins to engage. The movement from B to C represents the travel controlling the movements of the car in starting. On this part of the clutch travel depends the proper starting of the car. The movement from C to D is the travel which is effected by spring 51 and insures complete engagement of the clutch with full pressure of clutch spring 5. It also provides the necessary clearance at the clutch thrust bearing 9 to prevent undue wear on this bearing.

Although only a single embodiment of the invention has been illustrated and described, it is to be expressly understood that the same is not limited thereto but that various changes may be made in the mechanical details as well as in the design and arrangement of parts illustrated without departing from the spirit and scope of the invention as the same will now be understood by those skilled in the art. Reference will, therefore, be had primarily to the appended claims for a definition of the limits of the invention.

What is claimed is:

1. A control system for automotive vehicles, comprising a control device, a fluid pressure actuated motor connected to said device and capable of operating the same, a source of suction, means connecting said motor to said source and to atmosphere, valve means for controlling said connecting means, electro-magnetic means for actuating said valve means, switch means operable by said power device, a solenoid in circuit with said last-named switch means, and a valve actuated by said solenoid.

2. In a clutch control device for motor vehicles, a power device connected to the clutch and capable of releasing it, a control device for the power device to cause it to function to release the clutch, and automatic means controlled by movement of the clutch to irregularly control said power device for varying the resistance of the latter to the engaging movement of the clutch, said automatic means comprising electrically controlled valve means.

3. In a clutch control device for motor vehicles, a suction operated power device connected to the clutch and capable of releasing it, means for connecting the power device with the intake manifold of the motor, and means for controlling said connecting means, said power device comprising means including electrically operated valve means for varying the resistance to the engaging movement of the clutch.

4. In a clutch control device for motor vehicles, including a spring tending to cause engagement of the clutch, means for automatically controlling engagement of the clutch comprising relatively movable piston and cylinder members, means for connecting one of said members with the clutch, a connecting passage from the interior of the cylinder to the atmosphere, and means operated by movement of the clutch for controlling said passage to control the degree of vacuum in said cylinder and thus control resistance to movement of the clutch under action of the spring, said last named means including electrically operated valve means.

5. In an automotive vehicle provided with a clutch comprising driving and driven members, fluid pressure operated power means for disengaging the clutch and controlling the engagement thereof, said power means comprising electrically operated valve means automatically operable, when the driving and driven members of the clutch contact with one another, to vary the fluid pressure within said power means to thereby decrease the rate of engagement of the clutch.

6. In a clutch control device for motor vehicles, a power device connected to the clutch and capable of releasing it, a control device for the power device to cause it to function to release the clutch, and control means for said power device including electrically controlled valve means for varying the resistance of the power device to the engaging movement of the clutch.

CHARLES A. BREWER.